(12) United States Patent
Dorsett

(10) Patent No.: US 9,505,485 B2
(45) Date of Patent: Nov. 29, 2016

(54) VORTEX GENERATION

(75) Inventor: Kenneth M. Dorsett, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 777 days.

(21) Appl. No.: 13/466,202

(22) Filed: May 8, 2012

(65) Prior Publication Data
US 2013/0299643 A1    Nov. 14, 2013

(51) Int. Cl.
*B64C 23/06* (2006.01)
*B64C 9/24* (2006.01)

(52) U.S. Cl.
CPC .......... *B64C 9/24* (2013.01); *B64C 23/06* (2013.01); *Y02T 50/162* (2013.01); *Y02T 50/32* (2013.01)

(58) Field of Classification Search
CPC .......... B64C 2003/146; B64C 2003/147; B64C 2003/148; B64C 2230/08; B64C 2230/22; B64C 2230/24; B64C 2230/26; B64C 21/10; B64C 23/06; B64C 9/34; B64C 7/00; B64C 3/48; B64C 3/50
USPC ............ 244/213, 214, 215, 216, 217, 199.1, 244/130
See application file for complete search history.

(56) References Cited

U.S. PATENT DOCUMENTS

| | | | | |
|---|---|---|---|---|
| 2,164,531 A * | 7/1939 | Lee | | 244/113 |
| 2,368,702 A * | 2/1945 | Bourne | | 244/130 |
| 2,800,291 A | 10/1951 | Stephens | | |
| RE24,099 E * | 12/1955 | Maxwell | | 244/211 |
| 2,740,597 A * | 4/1956 | Wittman | | 244/214 |
| 3,263,945 A * | 8/1966 | Wimpenny | | 244/200.1 |
| 3,463,418 A * | 8/1969 | Miksch | | 244/200.1 |
| 4,039,161 A * | 8/1977 | Bauer | | 244/213 |
| 4,040,579 A * | 8/1977 | McKinney | | 244/214 |
| 4,182,503 A * | 1/1980 | Muscatell | | 244/219 |
| 4,311,291 A * | 1/1982 | Gilbertson et al. | | 244/211 |
| 4,323,209 A * | 4/1982 | Thompson | | 244/199.1 |
| 4,422,606 A * | 12/1983 | Munroe | | 244/203 |
| 4,429,843 A * | 2/1984 | Thompson | | 244/199.1 |
| 4,432,516 A * | 2/1984 | Muscatell | | 244/219 |
| 4,434,957 A * | 3/1984 | Moritz | | 244/35 R |
| 4,553,721 A * | 11/1985 | Jorgensen | | 244/213 |
| 4,702,441 A | 10/1987 | Wang | | |
| 4,955,565 A * | 9/1990 | Coplin | | 244/204.1 |
| 5,088,665 A | 2/1992 | Vijgen et al. | | |
| 5,253,828 A * | 10/1993 | Cox | | 244/200.1 |
| 5,388,788 A * | 2/1995 | Rudolph | | 244/215 |
| 5,622,336 A * | 4/1997 | Chavanne et al. | | 244/129.1 |
| 6,105,904 A * | 8/2000 | Lisy et al. | | 244/200.1 |
| 6,135,395 A * | 10/2000 | Collett | | 244/209 |
| 6,328,265 B1 * | 12/2001 | Dizdarevic | | 244/213 |
| 6,450,457 B1 * | 9/2002 | Sharp | | 244/212 |
| 6,491,260 B2 * | 12/2002 | Borchers et al. | | 244/199.1 |
| 6,789,769 B2 * | 9/2004 | Mau et al. | | 244/214 |
| 7,229,049 B2 * | 6/2007 | Ambrose | | 244/213 |
| 7,275,721 B2 * | 10/2007 | Kallinen | | 244/200.1 |
| 7,669,800 B2 * | 3/2010 | Martin Hernandez | | 244/130 |
| 7,815,147 B2 * | 10/2010 | Martin Hernandez | | 244/130 |
| 8,061,652 B2 * | 11/2011 | Bender | | 244/87 |
| 8,231,084 B2 * | 7/2012 | Wright | | 244/214 |

(Continued)

*Primary Examiner* — Philip J Bonzell
*Assistant Examiner* — Michael Kreiner
(74) *Attorney, Agent, or Firm* — Reising Ethington P.C.

(57) ABSTRACT

A vortex generation apparatus including a vortex generator that deploys in response to deployment of a wing leading edge lift augmentation device. The vortex generator deploys into a position to generate vortices over a main wing body upper surface region trailing the vortex generator.

16 Claims, 2 Drawing Sheets

(56) References Cited

U.S. PATENT DOCUMENTS

| | | |
|---|---|---|
| 8,646,729 B2* | 2/2014 | Bushnell ................. 244/201 |
| 8,657,238 B2* | 2/2014 | Fox et al. ............... 244/204.1 |
| 2005/0116116 A1* | 6/2005 | Morgenstern ............ 244/214 |
| 2006/0060721 A1* | 3/2006 | Watts et al. ............. 244/200 |
| 2008/0217484 A1* | 9/2008 | Bender .................. 244/199.2 |
| 2010/0288887 A1* | 11/2010 | Parker .................... 244/213 |
| 2010/0288888 A1* | 11/2010 | Coconnier .............. 244/214 |
| 2011/0006165 A1* | 1/2011 | Ireland .................. 244/200.1 |
| 2011/0114795 A1 | 5/2011 | Voss et al. |

* cited by examiner

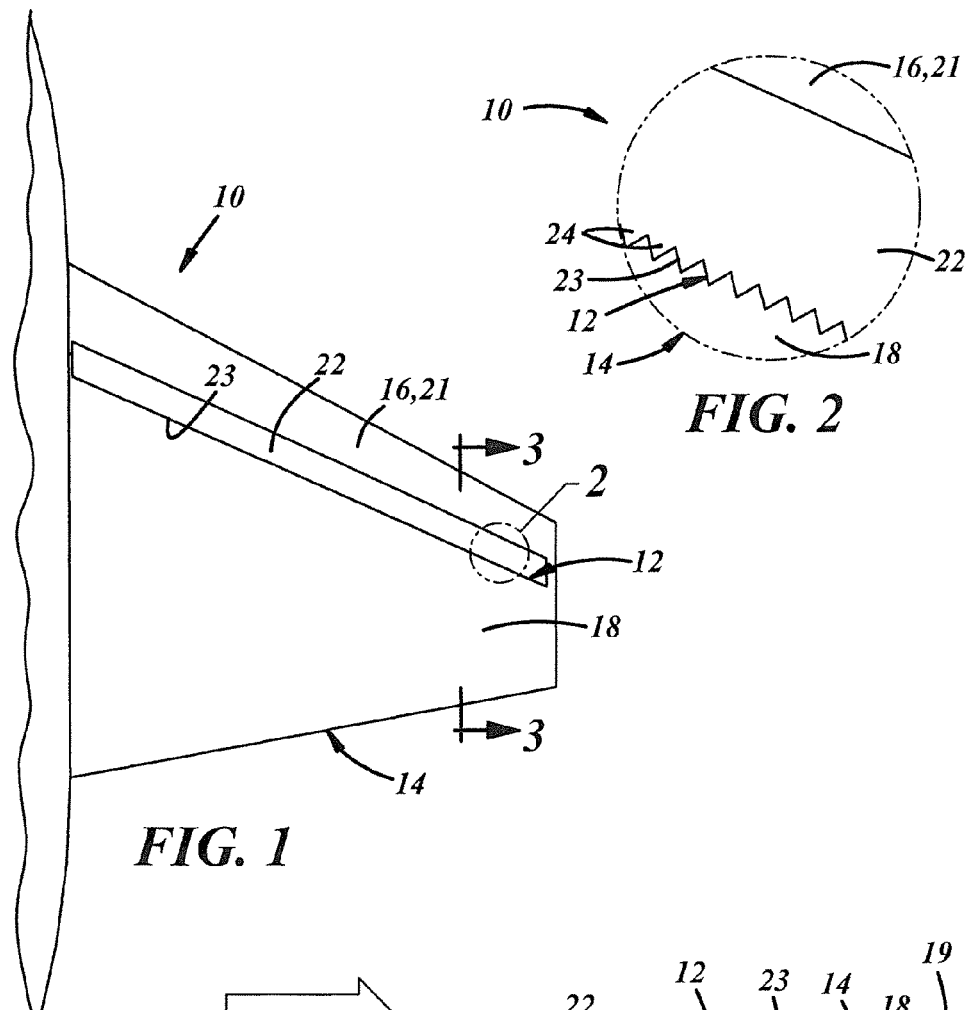
FIG. 1
FIG. 2
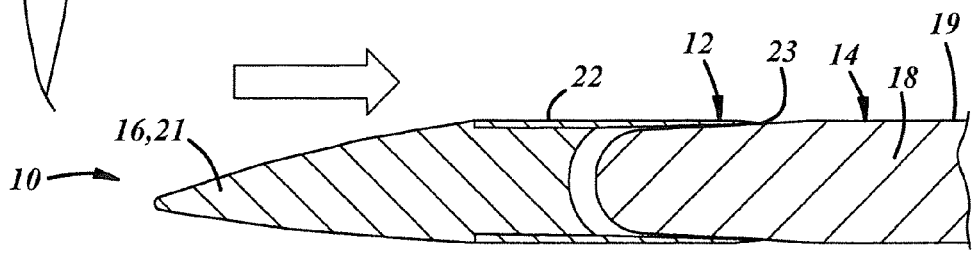
FIG. 3
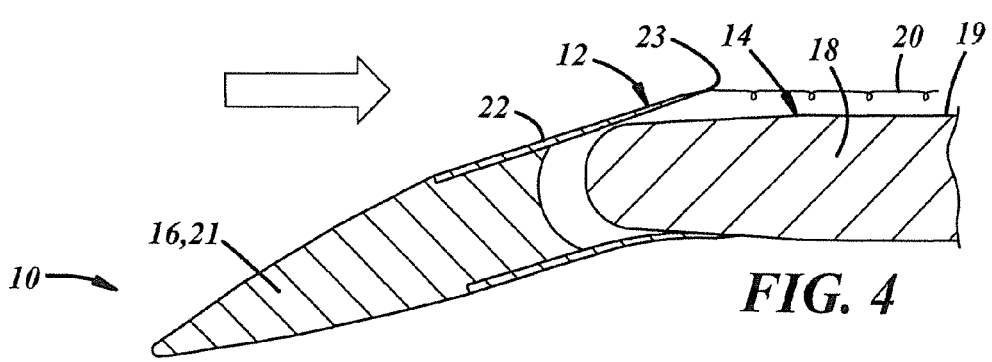
FIG. 4

VORTEX GENERATION

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

1. Field

This application relates generally to vortex generation over aircraft wing surfaces.

2. Description of Related Art Including Information Disclosed Under 37 CFR 1.97 and 1.98

Many swept wing aircraft suffer from aerodynamic buffet or asymmetric wing stall at high angles of attack (AOA) or high "alpha". Alpha is measured in units of degrees between a lifting body reference line, which is often the chord line of an airfoil, and a vector representing relative motion between the lifting body and the fluid through which the lifting body is moving. In the example given above, an angle-of-attack of 8 degrees would represent an angle of 8 deg between the chord line of the airfoil and the relative velocity vector of the airflow.

Under high alpha conditions, the upper surfaces of swept wings may experience reduced energy airflow, which may result in unsteady flow separation (stalling) and/or unsteady shock wave formation. This is known to be a cause of buffet and/or asymmetric stall problems that can result in poor aircraft handling qualities at high alpha.

Buffet and/or asymmetric wing stall may be induced by unsteady transonic tip shockwaves at combinations of transonic Mach numbers and high alpha. An unsteady transonic tip shock can occur when moderately high alpha, low-energy, separated flow conditions destabilize the normally-occurring wingtip shockwave on the upper surface of a wing. This phenomena may affect as much as a spanwise approximate outer half of aircraft wings. Because fighter aircraft tend to be operating at relatively high alpha when their pilots are attempting to track another aircraft for weapons employment, transonic tip shock-induced buffet can severely degrade weapons targeting. This is especially true for an aircraft that experiences buffet over an alpha range that includes the optimum sustained turn condition for the aircraft, e.g., an alpha value at which the aircraft can maintain a maximum turn rate without losing airspeed.

Such phenomena, being related to unsteady shock/boundary layer interaction issues, can be difficult to predict using known analytical tools such as computer modeling and wind tunnel testing. As a result, the propensity of a new aircraft to experience buffet and asymmetric stall problems at high alpha is often not detected until development has reached the stage of flight testing. At this point in a new aircraft's development, extensive airframe configuration changes necessary to reduce buffet and stall issues can be extremely difficult and expensive to make. However, there are a few relatively simple and inexpensive approaches to mitigating the problem with only minimal modifications being made to the existing structure of the aircraft. One such approach is the addition of vortex generators. Careful leading edge and trailing edge flap adjustments (scheduling) for different airspeeds and angles of attack may also mitigate a buffet problem, but oftentimes will not provide a complete or satisfactory solution on their own. Various types of vortex generators, snags, and/or strakes may be attached to or built into a wing's leading edge to energize airflow over the wing at high angles of attack, but such structures come with a significant drag penalty.

There are several commonly known leading edge lift augmentation devices that are incorporated into aircraft wing structures to improve an aircraft's performance at low airspeeds and/or high angles of attack. Slats, for example, are airfoils carried by main wing bodies of aircraft wings and deployed ahead or upstream of leading edges of the main wing bodies. Slats are thus positioned to allow air to flow through a slot between the slats and the main wing body leading edges to energize airflow over the wings at high angles of attack. Other leading edge lift augmentation devices, such as leading edge flaps, may be deployable in such a way as to effectively extend the leading edge of a wing forward and/or down. Yet other leading edge lift augmentation devices may be deployable in such a way as to rotate a portion of a wing's lower surface down and forward. Each of these leading edge configurations increases lift by helping the airflow turn as it encounters the wing at elevated angles of attack, thereby reducing or delaying flow separation.

Unfortunately, while leading edge lift augmentation devices greatly improve a wing's performance at low speeds and/or high angles of attack, and while vortex generators can be used to mitigate buffet under such conditions, both the leading edge lift augmentation devices and vortex generators tend to increase drag. Slats and flaps can be retracted flush with a wing's mold line to reduce drag, but vortex generators are generally fixed in place, and are thus seldom seen in an optimum size or configuration on high-performance aircraft. The use of vortex generators on low observable aircraft is also limited by a characteristic lack of low-observable compatibility.

SUMMARY

A vortex generation apparatus is provided, comprising a vortex generator configured for carriage on an aircraft wing and configured to deploy, in response to deployment of a wing leading edge lift augmentation device, into a position where the vortex generator will generate vortices over at least a portion of a main wing body upper surface region trailing the vortex generator.

Also provided is a vortex generation method comprising vortex generator deployment into a position where vortices are generated over a main wing body upper surface region trailing the vortex generator. According to this method vortex generator deployment is initiated by deployment of a wing leading edge lift augmentation device that is configured to deploy the vortex generator.

DRAWING DESCRIPTIONS

These and other features and advantages will become apparent to those skilled in the art in connection with the following detailed description and drawings of one or more embodiments of the invention, in which:

FIG. 1 is a fragmentary schematic top view of an aircraft showing a starboard wing of the aircraft comprising a leading edge lift augmentation device and a vortex generator deployable in response to deployment of the leading edge lift augmentation device;

FIG. 2 is an exploded view of a portion of the vortex generator and the leading edge lift augmentation device enclosed by circle 2 in FIG. 1;

FIG. 3 is a fragmentary schematic cross-sectional view of the wing of FIG. 1 taken along line 3-3 of FIG. 1 and showing the leading edge lift augmentation device and vortex generator in respective stowed positions;

FIG. 4 is a fragmentary schematic cross-sectional view of the wing of FIG. 1 showing the leading edge lift augmentation device and vortex generator in respective deployed positions.

DETAILED DESCRIPTION

Figure 5:
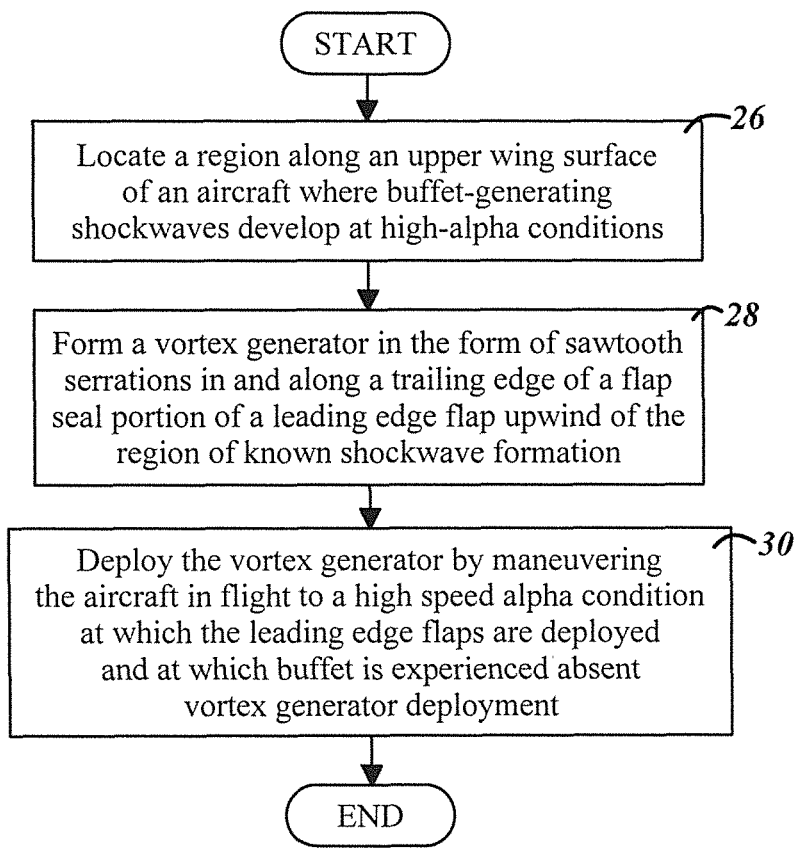
FIG. 5 is a flowchart showing a method of mitigating high alpha aircraft buffet.

A vortex generation apparatus is generally shown at 10 in FIGS. 1-4. The apparatus 10 may include a vortex generator 12 carried by an aircraft wing 14 that comprises a main wing body 18 and a leading edge lift augmentation device 16 carried by the main wing body 18. The apparatus 10 may be configured such that the vortex generator 12 is deployed in response to or along with deployment of the wing leading edge lift augmentation device 16. When deployed, the vortex generator 12 may be moved from a stowed position into a position where it generates vortices 20 over a main wing body upper surface region that trails or is downwind of the vortex generator 12. The vortex generator 12 may be positioned to mitigate aircraft buffet-producing effects, such as unsteady transonic tip shock, by energizing the flow in the region trailing or downwind of the vortex generator 12.

The leading edge lift augmentation device 16 may comprise a leading edge flap configured to deploy at elevated aircraft angles of attack such as, for example, at an aircraft angle of attack of approximately 8 degrees. The leading edge flap 16 may comprise a leading edge flap seal 22 that is carried by and extends aft from and along a main leading edge flap body 21. The flap seal 22 may be shaped and positioned to provide a smooth transition between an outer mold line of the leading edge flap 16 and an outer mold line of the main wing body 18, covering a gap between the main leading edge flap body 21 and the main wing body 18. The leading edge flap 16 may be supported on the main wing body 18 and shaped in such a way that the flap seal 22 lies flat along an upper surface or upper wing surface contour 19 of the main wing body 18 when the leading edge flap 16 is stowed as shown in FIG. 3. The leading edge flap 16 may also be shaped and supported such that the flap seal 22 continues to lie flat on the main wing body 18 over at least a portion of a range of leading edge flap deployment corresponding to low alpha values.

The vortex generator 12 may be incorporated into and along at least a portion of a trailing edge 23 of the leading edge flap seal 22 such that the vortex generator 12 lies flat along the upper wing surface contour 19 along with the flap seal trailing edge 23 when the leading edge flap 16 is stowed and/or is deployed only to a limited extent such that the flap seal trailing edge 23 is not yet angled or otherwise deflected away from the upper wing surface contour 19. The vortex generator 12 may be deployed by further deploying the leading edge flap 16 to an extent that the trailing edge 23 of the flap seal 22 deflects, along with the vortex generator 12, away from the upper wing surface contour 19 of the main wing body 18 as shown in FIG. 4. In other words, the leading edge flap 16 may be configured such that, when the leading edge flap 16 is deployed to an extent associated with high alpha values, e.g., alpha values greater than 8-10 degree deployment motion of the leading edge flap 16 rotates or otherwise deflects the flap seal trailing edge 23, and thus the vortex generator 12, away from the wing's mold line or upper surface contour 19 to extend into over-wing airflow.

As best shown in FIG. 2, the vortex generator 12 may comprise a pattern that is provided (e.g., formed, cut, or provided by any other suitable means) in and along a trailing edge 23 of a leading edge lift augmentation device 16, e.g., a flap seal trailing edge 23, to provide vortex generation when the device 16 is deployed to an extent that that the flap seal trailing edge 23 is deflected away from the upper wing surface contour 19 of the main wing body 18. The pattern provided in the trailing edge 23 of a leading edge lift augmentation device 16 may comprise serrations 24 having, for example, the approximate shape and configuration of saw-teeth. However, in other embodiments, the pattern provided in the flap seal trailing edge 23 may comprise any other suitable geometry providing vortex generation. The serrations 24 may be formed in and along an approximate spanwise outer third of the leading edge lift augmentation device 16 to limit vortex generation to a region where they can have a significant mitigating effect on unsteady transonic tip shock effects.

In practice, and as shown in FIG. 5, when the configuration of an aircraft's wings is found to be susceptible to high alpha buffet, the condition may be mitigated by first determining, as shown in action step 26, the region or regions along upper wing surfaces of the aircraft, where buffet-inducing shockwaves are forming under high alpha. The aircraft may then be equipped with vortex generators 12 configured to deploy, upon deployment of leading edge lift augmentation devices 16 of the aircraft, in respective locations where vortex generation will stabilize the buffet-inducing shockwaves. Where the leading edge lift augmentation devices 16 are leading edge flaps, the vortex generators 12 may be provided, as shown in action step 28, by forming serrations 24 in and along at least portions of trailing edges of flap seals of the leading edge flaps 16 that are disposed upwind of known regions of buffet-inducing shockwave formation. Where, for example, buffet is found to be caused by transonic tip shock, the serrations 24 may be formed along portions of flap seals 22 disposed along approximate respective outer thirds of the wings.

In other embodiments, the serrations 24 need not be limited to incorporation at optimal spanwise locations upwind of known areas of buffet-producing shock wave generation. The serrations 24 may instead be incorporated along a larger portion, even along the entire length, of flap seals 22 as may be desirable to minimize drag, maximize low-observable compatibility, delay flow separation, and/or to achieve a desired compromise between reduction of flow unsteadiness, drag, flow separation delay and low-observable characteristics. The size and angular geometry of each of the serrations 24 may also be optimized to provide a desired level of unsteady tip shock mitigation, flow separation delay, and low observable characteristics for a given application.

The vortex generators 12 may be deployed, as shown in action step 30, by maneuvering the aircraft in flight to a high alpha condition at which the leading edge flaps 16 are deployed and at which buffet would be experienced absent vortex generator deployment. Deployment of the leading edge flaps 16 will initiate or drive vortex generator deployment by, for example, moving the serrated trailing edges of flap seals 22 into respective positions to generate vortices 20 over respective regions of the upper wing surfaces trailing the vortex generator serrations 24. The vortex generators 12 may be deployed, in this manner, during only a portion of the device's range of deployment where buffet-inducing phenomena such as unsteady transonic tip shock at angles of attack are experienced.

Unlike a fixed vortex generator, a vortex generator integrated into and deployable with a leading edge flap as described above, does not increase drag when stowed during, for example, cruise flight and may be configured to be compatible with low observable airframe integration requirements. Integrating a vortex generator in this way should also result in the addition of little or no weight, and should provide better attenuation of wing buffet and asymmetric wing stall than would solutions such as leading and trailing edge flap scheduling alone.

This description, rather than describing limitations of an invention, only illustrates an embodiment of the invention recited in the claims. The language of this description is therefore exclusively descriptive and is non-limiting. Obviously, it is possible to modify this invention from what the description teaches. Within the scope of the claims, one may practice the invention other than as described above.

What is claimed is:

1. A vortex generation apparatus comprising a vortex generator coupled to a trailing edge of a wing leading edge lift augmentation device, and configured to deploy with the wing leading edge lift augmentation device into a position where the vortex generator will generate vortices over at least a portion of a main wing body upper surface region trailing the vortex generator;
   wherein the leading edge lift augmentation device comprises a leading edge flap having a flap seal; and
   wherein the vortex generator is incorporated into a trailing edge of the flap seal of the leading edge flap, which lays flat along the upper wing surface contour of the main wing body when the leading edge flap is stowed and which projects away from the upper wing surface contour of the main wing body when the leading edge flap is deployed.

2. A vortex generation apparatus as defined in claim 1 in which the vortex generator comprises a pattern provided in and along at least a portion of the trailing edge of the flap seal.

3. A vortex generation apparatus as defined in claim 2 in which the pattern comprises serrations.

4. A vortex generation apparatus as defined in claim 2 in which the vortex generator projects upward from the upper wing surface contour over at least a portion of a range of leading edge flap deployment and the vortex generator lies flat along the upper wing surface contour at least when the leading edge flap is stowed.

5. A vortex generation apparatus as defined in claim 4 in which the leading edge flap is configured such that:
   the vortex generator lies flat along the upper wing surface contour when the leading edge flap is stowed and when the leading edge flap is deployed only to a limited extent such that the flap seal trailing edge is not deflected away from the upper wing surface contour; and
   the vortex generator is deflected away from the upper wing surface contour when the leading edge flap is deployed sufficiently to deflect the flap seal trailing edge away from the upper wing surface contour to extend into over-wing airflow.

6. A vortex generation apparatus as defined in claim 2 in which the pattern is formed in and along an approximate spanwise outer third of the leading edge flap.

7. A vortex generation method comprising the step of deploying a wing leading edge lift augmentation device into a position where a vortex generator coupled to the device generates vortices over a main wing body upper surface region trailing the vortex generator;
   wherein the step of deploying a wing leading edge lift augmentation device includes deploying a leading edge flap; and
   wherein, before the leading edge flap deployment step, the method includes the additional step of forming the vortex generator in a trailing edge of a flap seal of the leading edge flap such that the vortex generator and trailing edge lie flat along the upper wing surface contour of the main wing body when the leading edge flap is stowed and project away from the upper wing surface contour of the main wing body when the leading edge flap is deployed.

8. The method of claim 7 in which the vortex generator formation step includes forming serrations in and along at least a portion of the trailing edge of the flap seal of the leading edge flap.

9. The method of claim 8 in which the step of forming serrations includes at least one of optimizing spanwise spacing for tip shock mitigation or optimizing location of the serrations for tip shock mitigation.

10. The method of claim 9 in which the step of optimizing the location of the serrations includes optimizing the spanwise location of the serrations to coincide with a spanwise location of a known area of unsteady separated flow.

11. The method of claim 8 in which the step of forming serrations includes optimizing at least one of spanwise spacing and location of the serrations to reduce drag.

12. The method of claim 8 in which the step of forming serrations includes at least one of optimizing spanwise spacing to improve low-observable characteristics or optimizing location of the serrations to improve low-observable characteristics.

13. The method of claim 8 in which the step of forming serrations includes at least one of optimizing spanwise spacing to achieve a desired compromise between drag, unsteady tip-shock mitigation, and low-observable characteristics or optimizing location of the serrations to achieve a desired compromise between drag, unsteady tip-shock mitigation, and low-observable characteristics.

14. The method of claim 8 in which the step of forming serrations includes forming the serrations in and along an approximate spanwise outer third of the leading edge flap.

15. The method of claim 8 in which the step of forming serrations includes optimizing angular geometry of each of the serrations to provide a desired level of unsteady flow mitigation and low observable characteristics.

16. The method of claim 8 in which the step of forming serrations includes optimizing flap seal trailing edge serration size to provide a desired level of unsteady flow mitigation and low observable characteristics.

* * * * *